(12) United States Patent
Sekiguchi et al.

(10) Patent No.: US 10,616,514 B2
(45) Date of Patent: Apr. 7, 2020

(54) HYBRID CALIBRATION METHOD FOR ROW AND COLUMN NOISE CORRECTION

(71) Applicant: Sony Semiconductor Solutions Corporation, Kanagawa (JP)

(72) Inventors: Tomohiro Sekiguchi, Kanagawa (JP); Ping Wah Wong, Sunnyvale, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/886,493

(22) Filed: Feb. 1, 2018

(65) Prior Publication Data
US 2019/0238770 A1 Aug. 1, 2019

(51) Int. Cl.
*H04N 5/365* (2011.01)
*H04N 5/378* (2011.01)
*H04N 5/361* (2011.01)
*H04N 5/369* (2011.01)
*H04N 5/343* (2011.01)

(52) U.S. Cl.
CPC ........... *H04N 5/3658* (2013.01); *H04N 5/343* (2013.01); *H04N 5/361* (2013.01); *H04N 5/3655* (2013.01); *H04N 5/36963* (2018.08); *H04N 5/378* (2013.01)

(58) Field of Classification Search
CPC ......... H04N 5/365–3675; H04N 5/378; H04N 5/21–2178
See application file for complete search history.

(56) References Cited

U.S. PATENT DOCUMENTS

| 6,522,355 B1 * | 2/2003 | Hynecek | H04N 5/361 348/243 |
| 2006/0061668 A1 * | 3/2006 | Ise | H04N 5/3575 348/222.1 |
| 2011/0141291 A1 * | 6/2011 | Dong | H04N 5/361 348/187 |
| 2018/0082628 A1 * | 3/2018 | Yu | G09G 3/2092 |

* cited by examiner

*Primary Examiner* — Paul M Berardesca
(74) *Attorney, Agent, or Firm* — Michael Best & Friedrich LLP (57) ABSTRACT

An image sensor and signal processing circuit therefor include a readout circuit, calibration circuitry that calculates a correction coefficient for an effective pixel circuit based on a calibration signal, adjustment circuitry that updates the correction coefficient based on an optical black pixel signal, and correction circuitry that applies the updated correction coefficient to the effective pixel signal and generates an output signal.

20 Claims, 11 Drawing Sheets

HYBRID CALIBRATION METHOD FOR ROW AND COLUMN NOISE CORRECTION

BACKGROUND OF THE INVENTION

1. Field of the Invention

This application relates generally to image sensors. More specifically, this application relates to a system and method for row and column noise calibration and removal in image sensor or other electronic applications.

2. Description of Related Art

Image sensing devices typically consist of an image sensor, generally implemented as an array of pixel circuits, as well as signal processing circuitry and any associated control or timing circuitry. Within the image sensor itself, charge is collected in a photoelectric conversion device of the pixel circuit as a result of the impingement of light.

Figure 1:
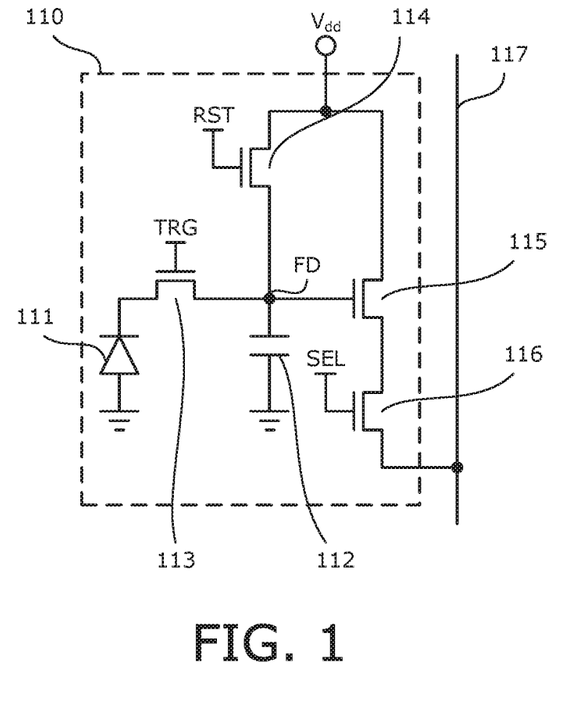
FIG. 1 illustrates an exemplary pixel circuit for use with various aspects of the present disclosure.

One example of a pixel circuit is illustrated in FIG. 1. As shown in FIG. 1, a pixel circuit 110 includes a photoelectric conversion device 111 (e.g., a photodiode), a floating diffusion FD, a storage capacitor 112, a transfer transistor 113, a reset transistor 114, a source follower transistor 115, a selection transistor 116, and a vertical signal line 117. As illustrated, the vertical signal line 117 is common to a plurality of pixel circuits within the same column. Alternatively, a particular vertical signal line may be shared among multiple columns. Gate electrodes of transfer transistor 113, reset transistor 114, and selection transistor 116 receive signals TRG, RST, and SEL, respectively. These signals may, for example, be provided by the control or timing circuitry. Light falling on photoelectric conversion device 111 is converted into an analog electrical signal.

While FIG. 1 illustrates a pixel circuit having four transistors in a particular configuration, the current disclosure is not so limited and may apply to a pixel circuit having fewer or more transistors as well as other elements, such as additional capacitors, resistors, and the like. Moreover, while FIG. 1 illustrates the source follower transistor 115 disposed between the selection transistor 116 and a power supply voltage $V_{dd}$, the selection transistor 116 may instead be disposed between the source follower transistor 116 and the power supply voltage $V_{dd}$. Additionally, the current disclosure may be extended to configurations where one or more transistors are shared among multiple photoelectric conversion devices.

The analog electrical signal generated in photoelectric conversion device 111 is retrieved by a readout circuit and is then converted to a digital value. Such a conversion typically requires several circuit components such as sample-and-hold (S/H) circuits, analog-to-digital converters (ADCs), and timing and control circuits, with each circuit component serving a purpose in the conversion. For example, the purpose of the S/H circuit may be to sample the analog signals from different time phases of the photodiode operation, after which the analog signals may be converted to digital form by the ADC.

Some image sensor designs including the above components use the method of correlated double sampling (CDS). CDS is capable of overcoming some pixel noise related issues by sampling each pixel circuit twice. First, the reset voltage $V_{reset}$ of a pixel circuit is sampled. This may also be referred to as the P-phase value or cds value. Subsequently, the data voltage $V_{data}$ of the circuit (that is, the voltage after the pixel circuit has been exposed to light) is sampled. This may also be referred to as the D-phase value or light-exposed value. The reset value $V_{reset}$ is then subtracted from the data value $V_{data}$ to provide a value which reflects the amount of light falling on the pixel circuit.

In an image sensor, there are typically a very large number of individual photoelectric conversion devices (e.g. tens of millions), and many ADCs working in parallel. Each ADC in the image sensor is shared by a large number of photoelectric conversion devices; for example, a column or multiple columns of photoelectric conversion devices may share a single ADC, a rectangular block of photoelectric conversion devices may share an ADC, and the like.

In such an implementation, the CDS method may be effective in reducing or removing noise due to the pixel circuits themselves but does not remove noise in the other circuit elements in the image sensor; for example, the readout circuit, the S/H circuit, and the ADC all introduce noise to various degrees. These noises introduce unwanted artifacts that influence the image quality and may lead to visible image defects.

For example, row noise and column noise may be introduced by circuit elements in the image sensor and can appear in the final output image as horizontal or vertical stripes. These noises may be may be static or fixed-pattern in nature and thus may not change from frame to frame. These noises may also be dynamic or temporal in nature, and thus change from frame to frame.

Row noise may be introduced during a data ADC stage and has roots in the reference bias noises. Row noise is typically both temporal and fixed-pattern in nature, and is the same for all pixel signals that pass through ADC at a particular moment in time. In some readout methods, these pixel signals relate to the same image row or a portion thereof, so that this noise manifests as visible row stripes in an image.

Column noise may arise from the mechanism of adding a voltage and/or current offset to a pixel value so as to bring the signal to within optimal working conditions for the readout circuitry. Although the added offset may be intended to be uniform for each readout circuit in the image sensor, the offset varies in practice due to the effects of noise and circuit variance. In a column-parallel ADC implementation the offset has both temporal and fixed-pattern components, and changes from column to column. This noise manifests as visible column stripes in an image.

Both temporal and fixed-pattern noise may be reduced or removed using a method of calibration and correction; however, the strategy is different depending on the type of noise. Because fixed-pattern noise does not change from frame to frame, it is possible to calibrate ahead of time; for example, during a power-on operation of the image sensor. The results of the calibration may be stored and later used to correct the pixel data as the frames are passing through the readout circuit. Temporal noise, in contrast, cannot be calibrated in advance and corrected based on stored calibration coefficients due to its changing nature. Thus, compensation parameters require recalculation for each image frame in real time.

Some candidate calibration methods require a large number of frames as inputs, and thus result in a long delay in the calibration procedure. Other candidate methods may themselves introduce noise as a relic of calculation. Accordingly, there exists a need for a calibration method that can accurately reduce noise due to circuit elements in an image sensor with minimal processing time.

BRIEF SUMMARY OF THE INVENTION

Various aspects of the present disclosure relate to an image sensor, readout circuit therefor, and calibration method thereof.

In one aspect of the present disclosure, a signal processing circuit is provided. The signal processing circuit comprises a readout circuit; calculation circuitry configured to calculate a correction coefficient for an effective pixel signal from a pixel circuit, based on a calibration signal; adjustment circuitry configured to update the correction coefficient based on an optical black pixel signal; and correction circuitry configured to apply the updated correction coefficient to the effective pixel signal and generate an output signal.

In another aspect of the present disclosure, a method of calibrating a signal processing circuit including a readout circuit is provided. The method comprises calculating, by a calculation module, a correction coefficient for an effective pixel signal from a pixel circuit, based on a calibration signal; updating, by an adjustment module, the correction coefficient based on an optical black pixel signal; and applying, by a correction module, the updated correction coefficient to the effective pixel signal so as to generate an output signal.

In yet another aspect of the present disclosure, an image sensor is provided. The image sensor comprises a pixel array including an effective pixel area and an optical black pixel area; and a readout circuit; calculation circuitry configured to calculate a correction coefficient for an effective pixel signal from a pixel circuit, based on a calibration signal; adjustment circuitry configured to update the correction coefficient based on an optical black pixel signal; and correction circuitry configured to apply the updated correction coefficient to the effective pixel signal and generate an output signal.

In this manner, the above aspects of the present disclosure provide for improvements in at least the technical field of signal processing, as well as the related technical fields of imaging, image processing, and the like.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

Moreover, while the present disclosure focuses mainly on examples in which the processing circuits are used in image sensors, it will be understood that this is merely one example of an implementation. It will further be understood that the disclosed systems and methods can be used in any device in which there is a need to reduce noise in a signal processing circuit; for example, an audio signal processing circuit, industrial measurement and systems, and the like.

[Image Sensor]

Figure 2:
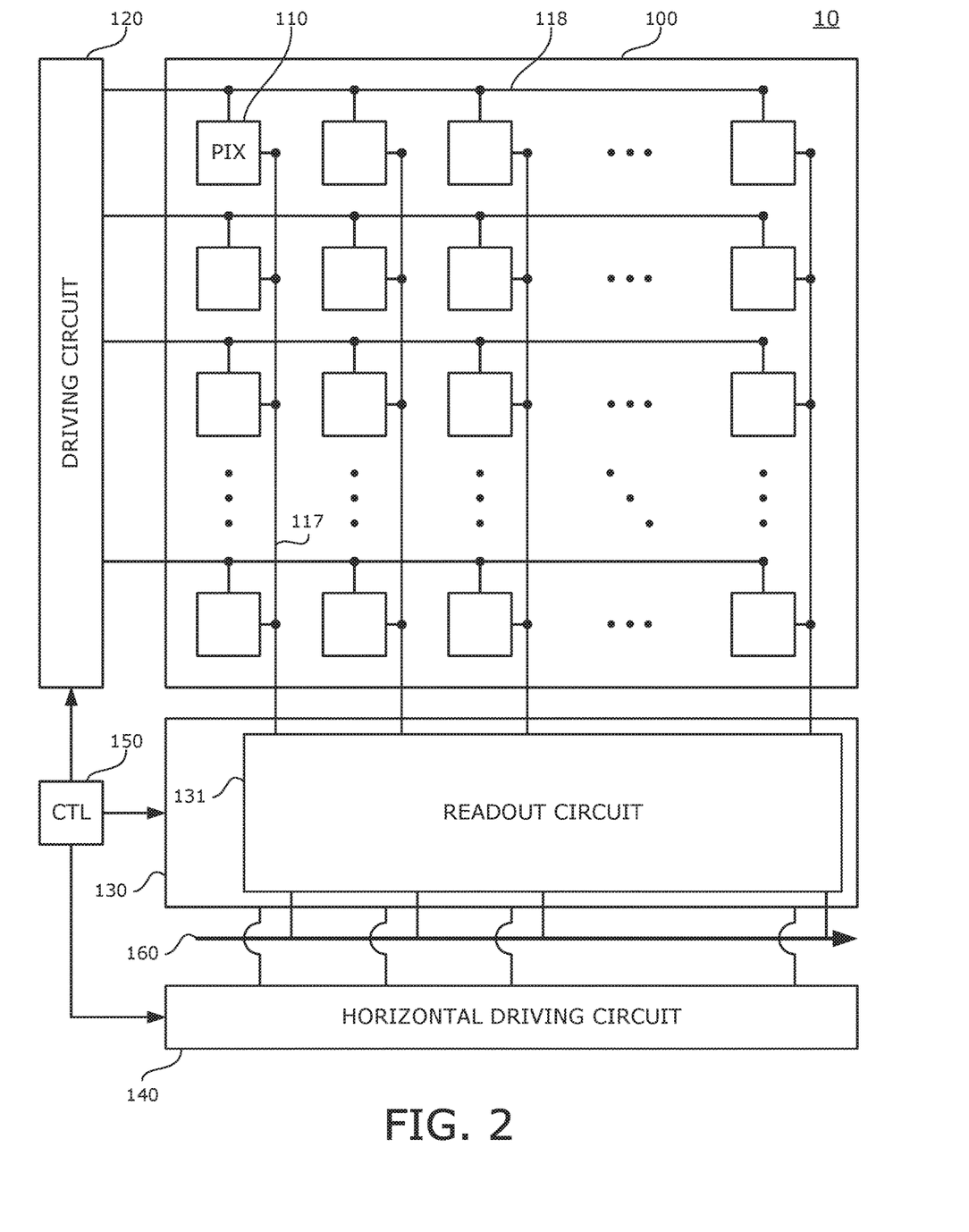
FIG. 2 illustrates an exemplary image sensor according to various aspects of the present disclosure.

FIG. 2 illustrates an image sensor 10 according to various aspects of the present disclosure. Image sensor includes an array 100 of pixel circuits 110 (for example, the pixel circuits illustrated in FIG. 1). The pixel circuits 110 are located at intersections where horizontal signal lines 118 and vertical signal lines 117 cross one another. The horizontal signal lines 118 are operatively connected to a vertical driving circuit 120, also known as a "row scanning circuit," at a point outside of the pixel array 100, and carry signals from the vertical driving circuit 120 to a particular row of the pixel circuits 110. Pixels in a particular column output an analog signal corresponding to an amount of incident light to the vertical signal line 117. For illustration purposes, only a subset of the pixel circuits 110 are actually shown in FIG. 2; however, in practice the image sensor 10 may have up to tens of millions of pixel circuits ("megapixels" or MP) or more.

The vertical signal line 117 conducts the analog signal for a particular column to a column circuit 130, also known as a "signal processing circuit." While FIG. 2 illustrates one vertical signal line 117 for each column in the pixel array 100, the present disclosure is not so limited. For example, more than one vertical signal line 117 may be provided for each column, or each vertical signal line 117 may correspond to more than one column. In any case, the column circuit 130 preferably includes a plurality of readout circuits 131, also known as "readout and ADC circuits," which will be described in more detail below.

The column circuit 130 is controlled by a horizontal driving circuit 140, also known as a "column scanning circuit." Each of the vertical driving circuit 120, the column circuit 130, and the horizontal driving circuit 140 receive one or more clock signals from a controller 150. The controller 150 controls the timing and operation of various image sensor components such that analog signals from the pixel array 100, having been converted to digital signals in the column circuit 130, are output via an output circuit 160 for signal processing, storage, transmission, and the like.

Figure 3:
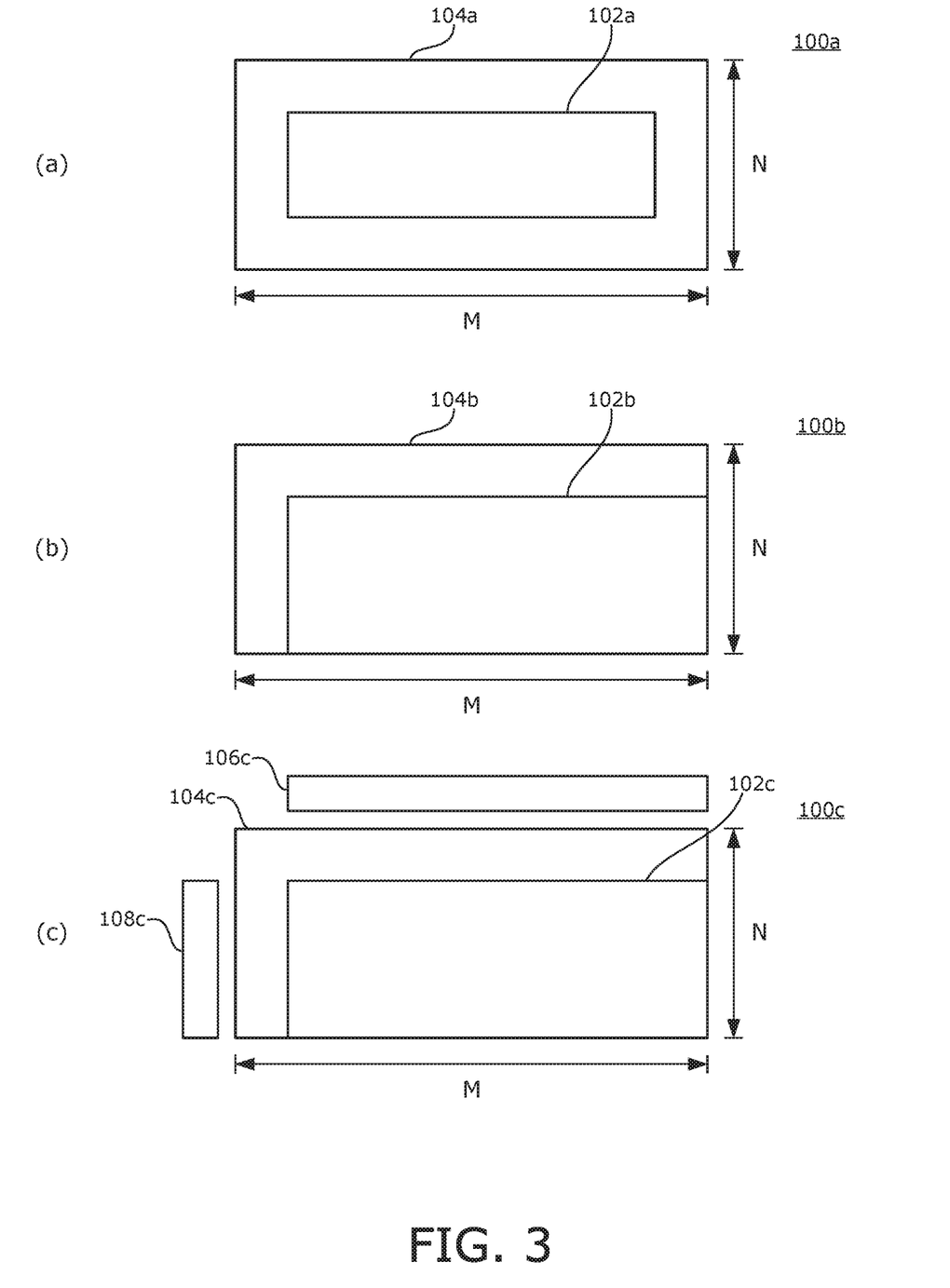
FIG. 3 illustrates exemplary configurations of pixel circuit types in the image sensor according to FIG. 2.

FIG. 3 illustrates several configurations of the image sensor 10, where the pixel array 100 includes M columns and N rows of the pixel circuits 110. In each configuration, the pixel array 100 includes an effective pixel area 102 and an optical black (OPB) pixel area 104. In configuration (a), a pixel array 100a includes a central effective pixel area 102a surrounded on all four sides by an OPB pixel area 104a. In configuration (b), an OPB pixel area 104b is disposed only at the top and left of an effective pixel area 102b. In configuration (c), an effective pixel area 102c and an OPB pixel area 104c are disposed similarly to configuration (b), except that data value arrays 106 and 108 are arranged in a grid having the same column and row structures as the pixel circuits, but are arranged separate from the effective pixel area 102c.

Configurations (a) through (c) illustrated in FIG. 3 are not exhaustive, and other physical arrangements of the effective pixel area, the OPB pixel area, and the data value arrays are possible. The column and row noise calibration and correction systems and methods discussed below are general in nature and are not restricted to configurations (a) through (c).

[Column Noise Calibration and Correction—OPB Pixel Circuits]

Figure 4:
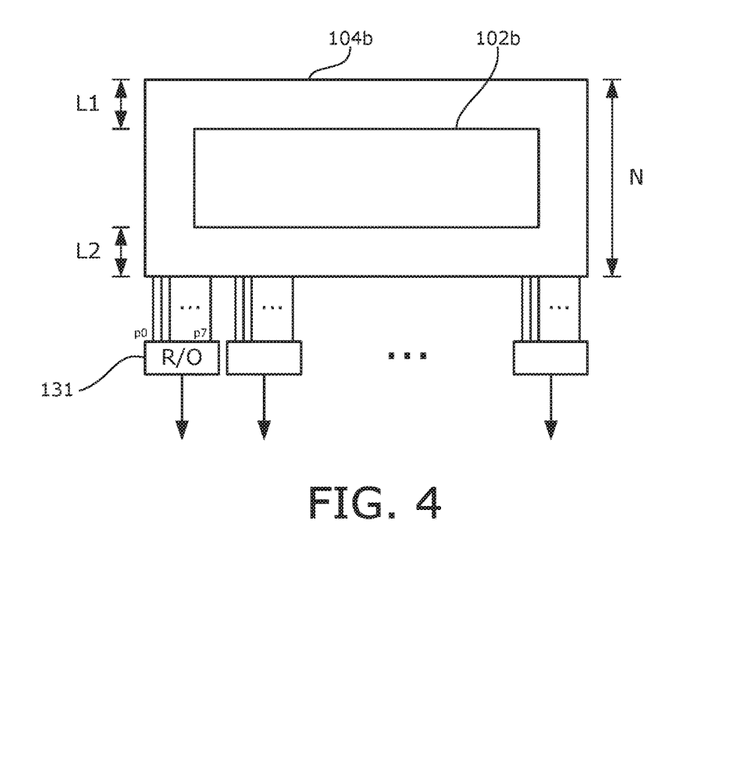
FIG. 4 illustrates an exemplary readout circuit arrangement for use with various aspects of the present disclosure.

To operate at a high frame rate (e.g., 120 frames per second or higher) with low power consumption, it is possible to arrange the readout circuits 131 such that one readout circuit 131 is provided per K columns of pixel circuits. FIG. 4 illustrates such an arrangement where one readout circuit 131 is provided for K columns, where K=8. This corresponds to an interpretation whereby, during a readout operation where rows of pixel circuits are to be read, the pixel circuits within the row are partitioned into groups of 8 pixel circuits. Different groups of pixel circuits are read out in parallel, and the 8 pixel circuits within each group are read out sequentially. For explanatory purposes, this will be referred to as partitioning the pixel circuits into "phases," where the pixel circuits for each phase are read out in parallel. Thus, FIG. 4 illustrates eight phases p0 to p7. Pixel circuits in the entire image sensor are read one row at a time, such that a first row (row 0) is read according to a sequential ordering of the phases p0 to p'7, followed by a second row (row 1) according to a sequential ordering of the phases p0 to p'7, and so on until a final row (row m) is read according to a sequential ordering of the phases p0 to p7.

Because the signals from the pixel circuits in each column go through different circuit components at different times, irregularities and variations in each component as well as power supply and temporal noise variations can produce column fixed-pattern noise (FPN) artifacts. To mitigate this, it is preferable to determine the mismatch and correct for the error in order to achieve high quality in the output image.

Figure 5:
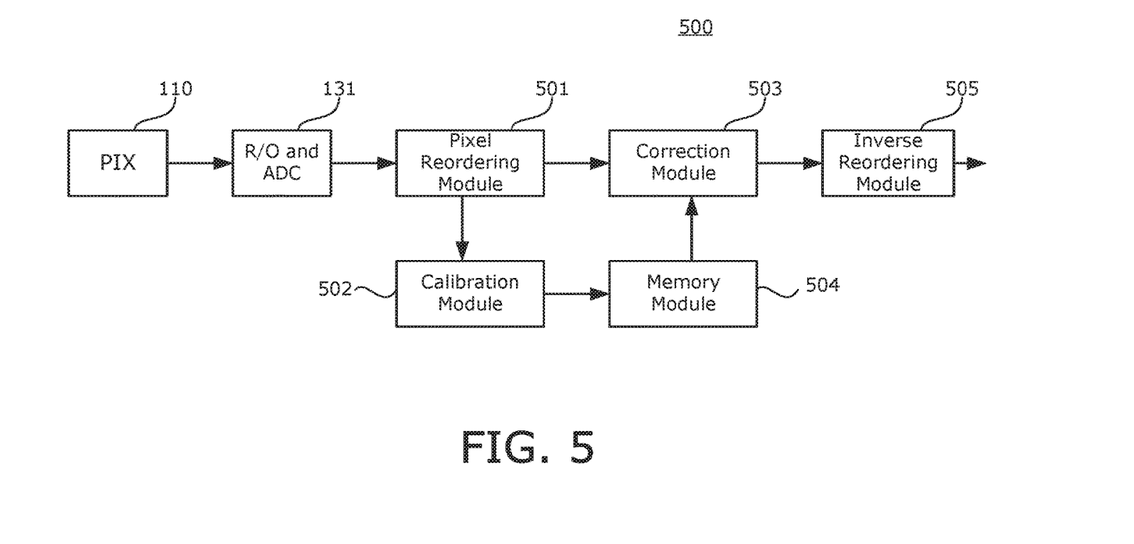
FIG. 5 illustrates an exemplary calibration and correction system for use with various aspects of the present disclosure.

FIG. 5 illustrates a block diagram for a FPN calibration and correction system 500 and method for an image sensor. The system 500 comprises the pixel circuit 110, a readout and ADC circuit 131, a pixel reordering module 501, a calibration module 502, a correction module 503, a memory module 504, and an inverse reordering module 505. Analog data from the pixels 110 are read out and converted to digital form in the readout and ADC circuit 131. It is understood, although not explicitly illustrated in FIG. 5, that sample and hold circuits may be present to hold the data prior to analog-to-digital conversion. In certain implementations, however, the pixel reordering module 501 and inverse reordering module 505 may not be present. The various modules may be implemented as hardware, such as by dedicated circuit components, by software within the readout circuit 131, or by a combination of hardware and software. In operation, the calibration module 502 computes statistics for the purpose of FPN reduction, resulting in a set of correction coefficients that are stored in the memory module 504. The pixel signals are corrected for FPN in the correction module 503, which retrieves the correction coefficients from the memory module 504 during the correction step.

In implementations which lack the pixel reordering module 501 and the inverse reordering module 505, pixel data can be directly used in the calibration module 502 and the correction module 503. This may be possible in image sensor designs where the phases p0 to p7 are respectively connected to the readout circuit 131 in a natural ordering of the image pixels via a switching mechanism in the readout. In implementations where the pixel data is sent in an order different from the natural ordering of the image (that is, different from the ordering in the pixel array 110), then the pixel reordering module 501 and the inverse reordering module 505 are required so that the data can be arranged in a manner suitable for FPN calibration and correction.

To correct the column FPN noise, statistics can be collected for each column and then used in a correction process. For example, FIG. 4 illustrates the arrangement according to configuration (a) of FIG. 3, where the top L1 rows and bottom L2 rows of pixel circuits are in the OPB pixel area 104b, so that a total of L rows of pixel circuits are in the OPB pixel area 104b, where L=L1+L2. Each column of pixel circuits in the effective pixel area 102b is subject to offset variation as a result of variations in the readout circuit 131; however, each column of pixel circuits in the OPB pixel area 104b also passes through the readout circuit 131 and is thus subject to the same variation from the circuit components.

It is thus possible to estimate the column offset variation by taking an average for each column of OPB data, according to the following expression (1):

$$\text{offset}(j) = \frac{1}{L} \sum_{i=0}^{L-1} OPB(i, j) \quad (1)$$

Above, OPB(i,j) represents the value of the OPB pixel circuit with a row index i and a column index j pointing at the pixel array, and offset(j) represents the variation for the column with index j. As an example, consider the OPB configuration in FIG. 3, configuration (a), where L1 rows of OPB pixels are located at the top of the pixel array, L2 rows of OPB pixels are located at the bottom of the pixel array, and N-L1-L2 rows of active pixels are located in the middle of the array. In this case, it is understood that expression (1) sums over the top L1 and bottom L2 rows of OPB pixels. For simplicity of presentation, it is understood that the pixel indices i and j in expression (1) are suitably defined so that only the OPB pixels at the top and the bottom of the array are included in the expression. Similar notations and understanding are used to reference the OPB pixels in the rest of this disclosure.

If one or more OPB pixel circuit is defective, the value calculated in expression (1) might be skewed. That is, a "bad" OPB pixel circuit can distort the statistics of a particular column in which the pixel circuit is located, and thus cause a degradation of the correction. This may be overcome in at least two different methods. First, it is possible to detect and reject defective pixel circuits within the calibration data according to the following expression (2):

$$\text{offset}(j) = \frac{\sum_{i=0}^{L-1} OPB(i,j) \times \mathbb{1}_{OPB(i,j)=good}}{\sum_{i=0}^{L-1} \mathbb{1}_{OPB(i,j)=good}} \quad (2)$$

Above, $\mathbb{1}_x$ is the indicator function; that is, 1 when the argument x is true and 0 when the argument x is false. Therefore, in expression (2), only non-defective ("good") pixel circuits are included in calculation offset(j). Because defective pixel circuits are ignored, their impact on the correction is minimized.

Second, it is possible to detect and correct effective pixel circuits; for example, by replacing the value of OPB(i,j) with an estimated value consistent with the neighboring pixel circuits. The estimated value may be a local average, a local median, and the like. Thus, the statistics may be found according to the following expression (3):

$$\text{offset}(j) = \frac{1}{L} \sum_{i=0}^{L-1} OPB'(i,j) \quad (3)$$

Above, OPB'(i,j) is equal to OPB(i,j) if the pixel circuit is non-defective, and is equal to a replacement value if the pixel circuit is defective.

In either method, it is possible to define the correction coefficient coef(j). according to the following expression (4):

$$\text{coef}(j) = \text{offset}(j) - b \quad (4)$$

Above, b represents a black level value which defines the black level of the corrected image. Thus, the correction procedure occurs according to the following expression (5):

$$y(l,j) = x(l,j) - \text{coef}(j) \quad (5)$$

Above, x(l,j) represents an input pixel value and y(l,j) represents a corrected pixel value.

In order to obtain good performance after correction with low residual FPN, the statistics offset(j) should be a good approximation of the actual offset value that includes the circuit variations in column j. Because random noise is present in every calibration sample (that is, in every OPB pixel circuit), each OPB pixel may be represented according to the following expression (6):

$$d(i,j) = v(j) + r(i,j) \quad (6)$$

Above, v(j) represents the offset value due to the circuit variations in column j, and r(i,j) represents uncorrelated random noise at the OPB pixel circuit d(i,j). Because the circuit variations within a column are the same for all pixel circuits in that column, v(j) is the same for all pixels in column j and is not dependent on the row index i. Therefore, the offset statistics according to expression (1) may be written according to the following expression (7):

$$\text{offset}(j) = \frac{1}{L} \sum_{i=0}^{L-1} (v(j) + r(i,j)) \quad (7)$$

Similarly, if it is desired to detect or correct for bad OPB pixel circuits, expression (6) may instead be used to rewrite either expression (2) or expression (3). In any case, because the noise r(i,j) is random it has a mean value of zero and a standard deviation $\sigma_r$, which is independent of the coordinates i and j. The degree of agreement between the statistics offset(j) and the actual offset can be examined by considering the standard deviation of offset(j), according to the following expression (8):

$$\sigma(j) = \frac{\sigma_r}{\sqrt{L}} \quad (8)$$

Thus, it can be seen that the estimate improves as the number of samples (that is, the number of rows of OPB pixel circuits L) increases.

Depending on the design specification, the value of L preferred to obtain a good performance may be on the order of several hundred or more. For a typical image sensor, it may not be feasible to require a large number of rows of OPB pixel circuits because this may result in a camera module having a large size and/or high power consumption. For an image sensor with a comparatively small number of rows of OPB pixel circuits, a multi-frame calibration approach may be used.

Figure 6:
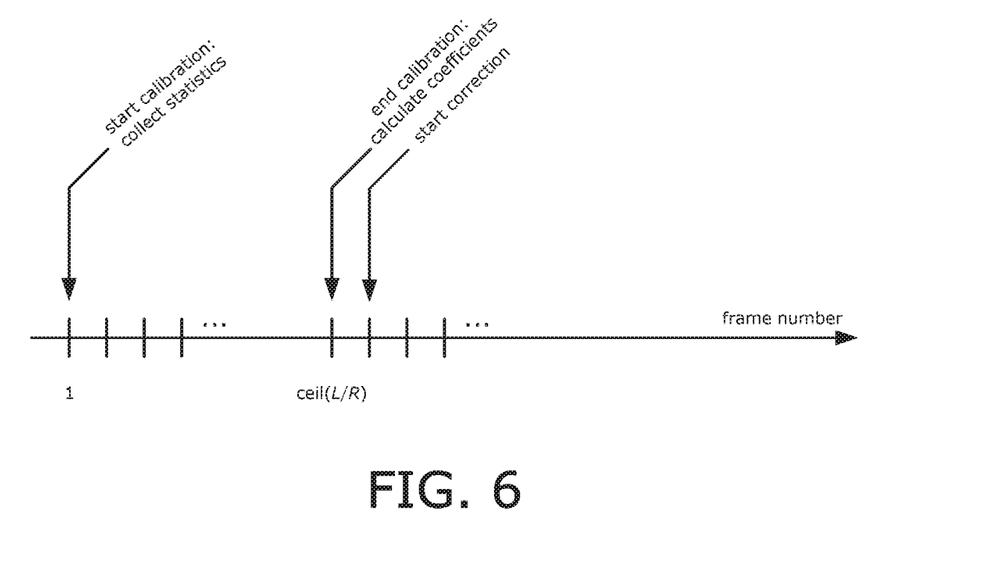
FIG. 6 illustrates an exemplary timeline for a multi-frame calibration method according to various aspects of the present disclosure.

For example, consider a case where L is the number of rows of OPB pixel circuits required to achieve a desired level of performance quality, and R is the number of rows of OPB pixel circuits available in a particular image sensor design. In this case, the desired level of performance quality may be achieved by using ceil(L/R) frames, where ceil(x) is the ceiling function (that is, rounding the argument up to the next integer if the argument is not itself an integer). For example, if R=40 rows of OPB pixel circuits are available but L=380 rows of OPB pixel circuits would give the desired level of performance quality, 10 calibration frames are used. FIG. 6 illustrates an exemplary timeline for such a multi-frame calibration method. When calibration starts (for example, at frame 1), the memory holding the statistics is reset. At this time, a signal is sent to start the calibration and the collection of statistics begins. Once the requisite number of frames have passed (for example, at frame ceil(L/R)), the correction coefficients are calculated according to expression (4) above. Thereafter, correction is performed according to expression (5) above.

[Column Noise Calibration and Correction—Calibration Voltage Source]

Figure 7:
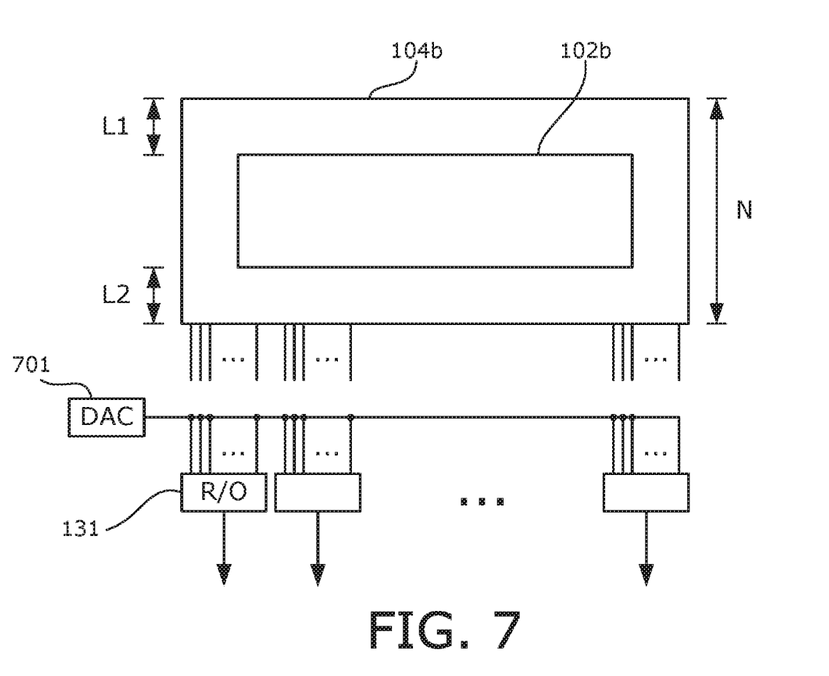
FIG. 7 illustrates an exemplary calibration voltage source configuration according to various aspects of the present disclosure.

As noted above, using rows of OPB pixel circuits may present difficulties where R is limited due to the image sensor and pixel array designs. As an alternative, it is possible to use a calibration voltage source. FIG. 7 illustrates an exemplary calibration voltage source configuration with a similar layout to that illustrated in FIG. 4.

That is, similar to FIG. 4, FIG. 7 illustrates an arrangement where one readout circuit 131 is provided for K columns, where K=8. In this case, however, the corresponding pixel circuits are connected to the readout circuit 131 in a switchable manner. Thus, the pixel circuits may be disconnected from the readout circuit 131, and the readout circuit 131 is instead connected to a calibration voltage source implemented as a digital-to-analog converter (DAC) 701. The actual voltage level from the calibration voltage source may be controlled by a digital input to the DAC 701. As a result the digital input to the DAC controls the signal to be used in calibration in this case. Because the calibration voltage passes through the same set of readout circuits 131, it can provide a mechanism for measuring the variations among the different readout circuits 131 and thus produce an estimate for the correction coefficients offset(j).

Moreover, because the voltage level from the DAC 701 may be easily controlled, the measurement for the offset can be adjusted to suit the particular dark level for the image sensor. As above, each measurement from the readout circuit 131 is subject to random noise from the circuit. Therefore, similar to the reasoning for expression (7) above, the statistics may be estimated according to the following expression (9):

$$\text{offset}(j) = \frac{1}{L}\sum_{i=0}^{L-1}(u(j) + r(i, j)) \quad (9)$$

Above, u(j) represents the offset sample values due to the circuit variations within column j when the DAC 701 is connected thereto. Using the calibration voltage method has an advantage in that measurements from the output of the readout circuit 131 may be made as many times as needed, without restrictions caused by the number of available rows of OPB pixel circuits. Thus, calibration may be performed in one frame and the calibrated results are immediately available, without the delay present in the OPB pixel circuit method.

While the configuration illustrated in FIG. 7 can produce an estimate of the variations in the readout circuit 131, it is not necessarily true that the estimate is completely identical to the result from the OPB circuit method. In other words, u(j) of expression (9) may not be identical to v(j) of expression (7). This is the case because the path from the DAC 701 to the output in each column is similar but not identical to the path from the OPB pixel circuits to the output. Because the DAC 701 is connected to all columns, there may be a voltage drop (according to Ohm's law) when the voltage crosses several columns in the sensor. Moreover, the wiring from the OPB pixel circuit to the readout circuit 131 is not the same as the wiring from the DAC 701 to the readout circuit 131. Thus, the offset correction coefficients measured using the DAC 701 may not completely reflect the offset variations when the OPB pixel circuits are connected.

Figure 8:
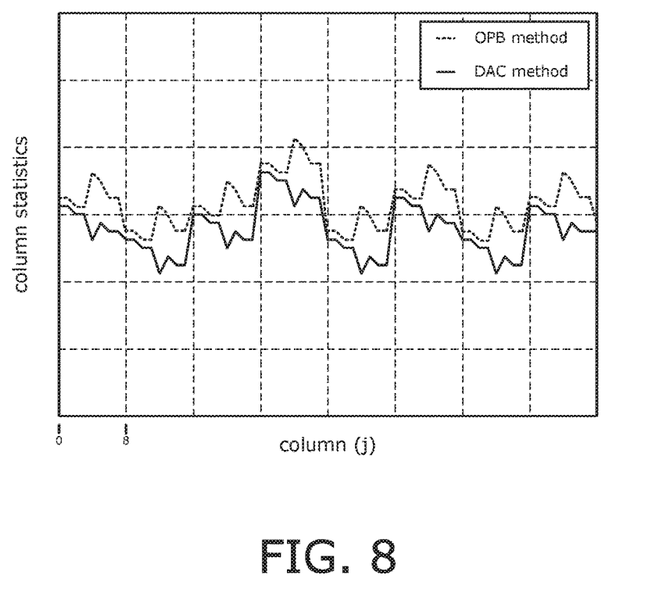
FIG. 8 illustrates a graph of column statistics for an exemplary image sensor according to various calibration methods of the present disclosure.

FIG. 8 illustrates a graph of the column statistics (column averages) for an exemplary image sensor using both the OPB method (dotted line) and the DAC method (solid line). The graph illustrated in FIG. 8 corresponds to the readout circuit configuration illustrated in FIGS. 4 and 7; that is, a configuration where K=8 columns are provided for each readout circuit 131. Specifically, FIG. 8 illustrates an example where the DAC method data and the OPB method data track one another well except for columns at phases p4 to p7. For explanatory purposes, it is assumed that the data from the OPB method is higher than the data from the DAC method with differences of about 15 digital levels (in the arbitrary scale) for a bit depth of 14 bits. This is consistent with experimental results from some sensor embodiments. For this example, if the DAC method is used to calibrate and then correct the pixel data, there will be a difference of approximately $15/2^{14}=0.1\%$ relative to the full level, at unitary gain. For higher gains, the difference will be proportionately higher. This difference level may be visible in some image sensor implementations.

[Column Noise Calibration and Correction—Hybrid]

While FIG. 8 shows that the OPB method and DAC method data are different in some phases, the difference within each phase is consistent. That is, the difference in one p7 phase data is substantially the same as the difference in another p7 phase data. To prevent visible errors from the DAC method while avoiding the additional design considerations of the OPB method, it is possible to use a hybrid calibration method, in view of this in-phase consistency. Specifically, it is possible to use the DAC measured data to calibrate for each column, and then use the OPB data to correct for phase differences. Thus, the hybrid calibration method proceeds in two stages. In the first stage, a DAC is used for calibration whereby initial values for the correction coefficients are calculated. In the second stage, OPB pixel circuits are used for calibration whereby the correction coefficients are updated. The hybrid calibration method allows for fast calibration, and remains viable in situations where a large number of calibration samples is desired or required.

Figure 9:
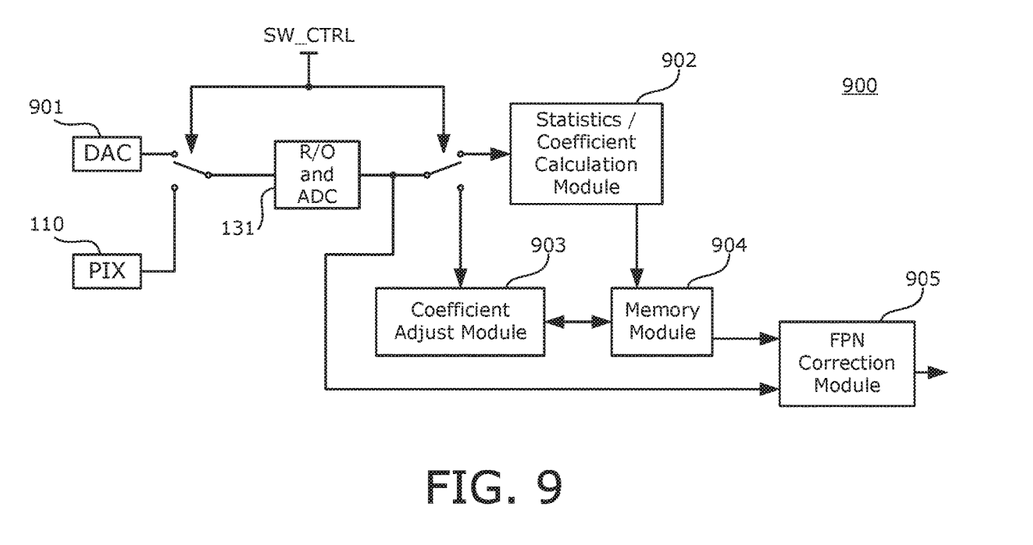
FIG. 9 illustrates an exemplary hybrid calibration system for use with various aspects of the present disclosure.
Figure 10:
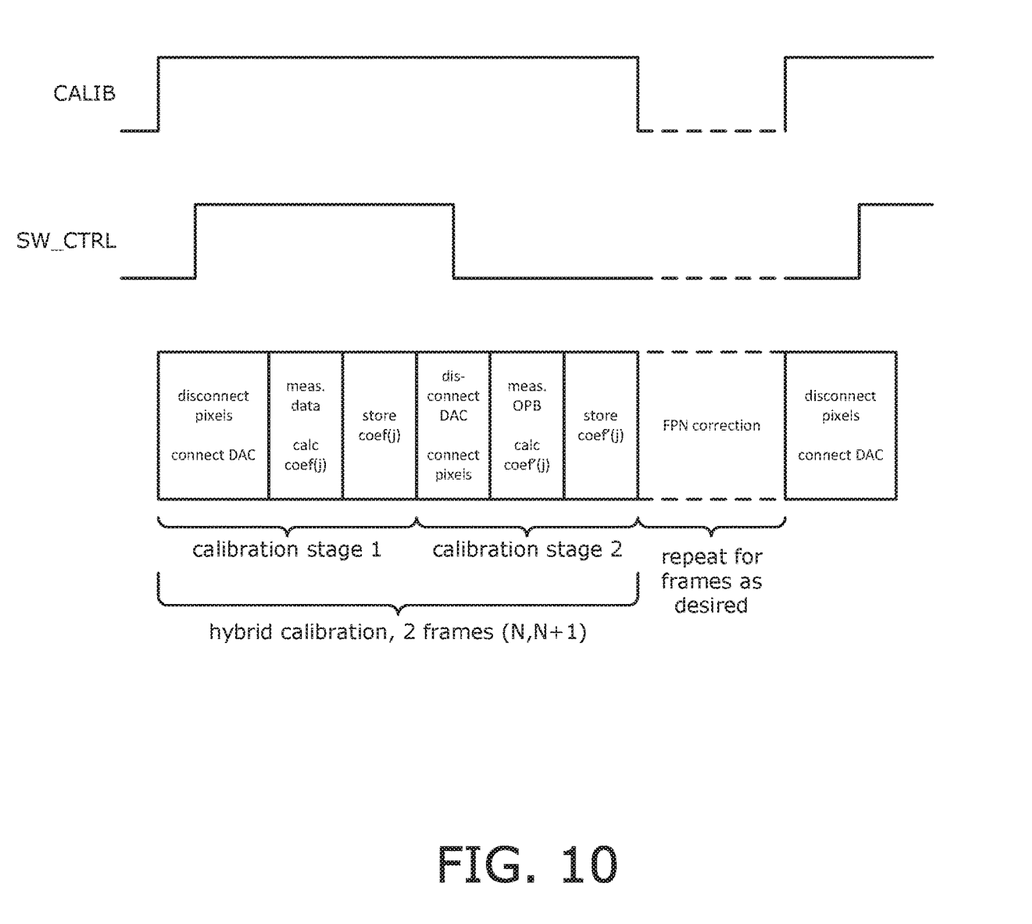
FIG. 10 illustrates an exemplary timing diagram for the hybrid calibration system according to FIG. 9.
Figure 11:
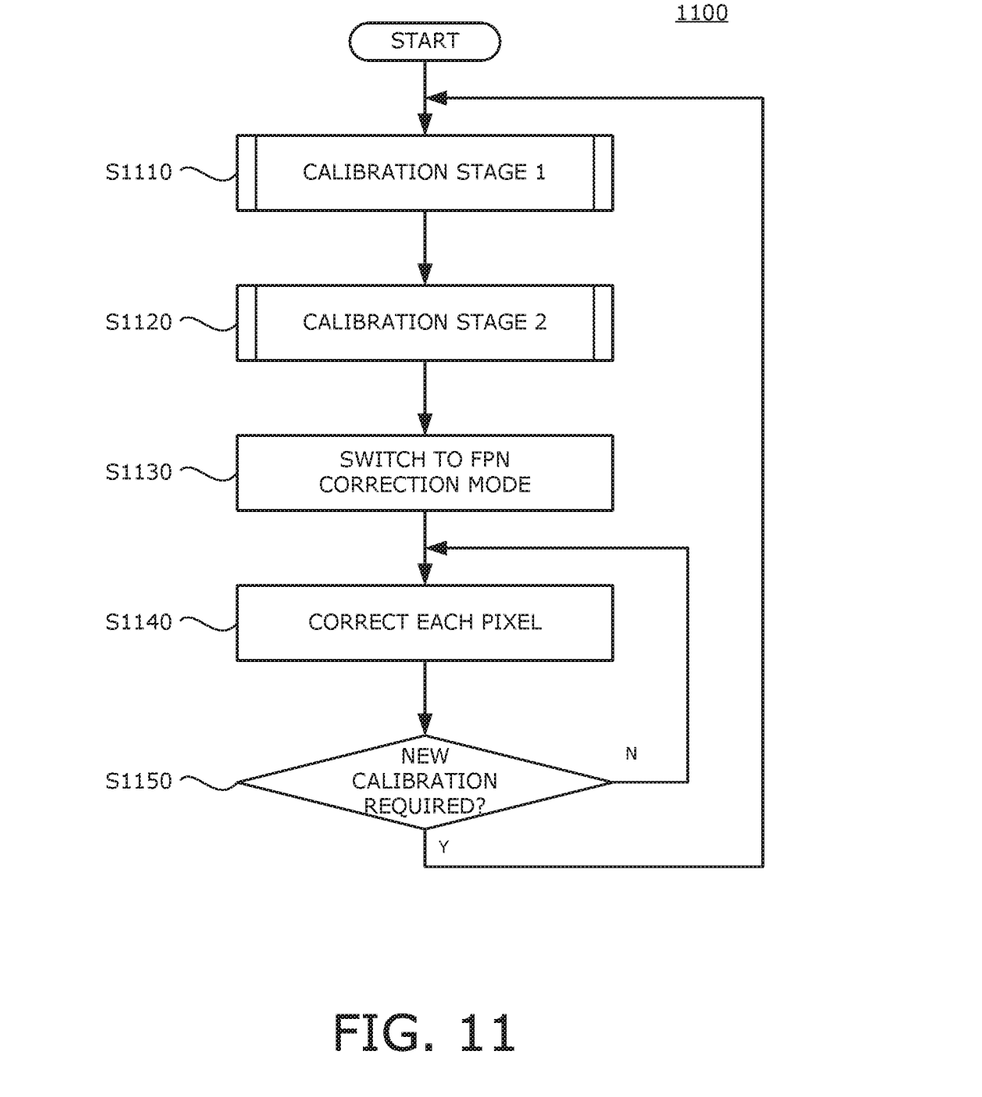
FIG. 11 illustrates an exemplary hybrid calibration method for the hybrid calibration system according to FIG. 9.
Figure 12:
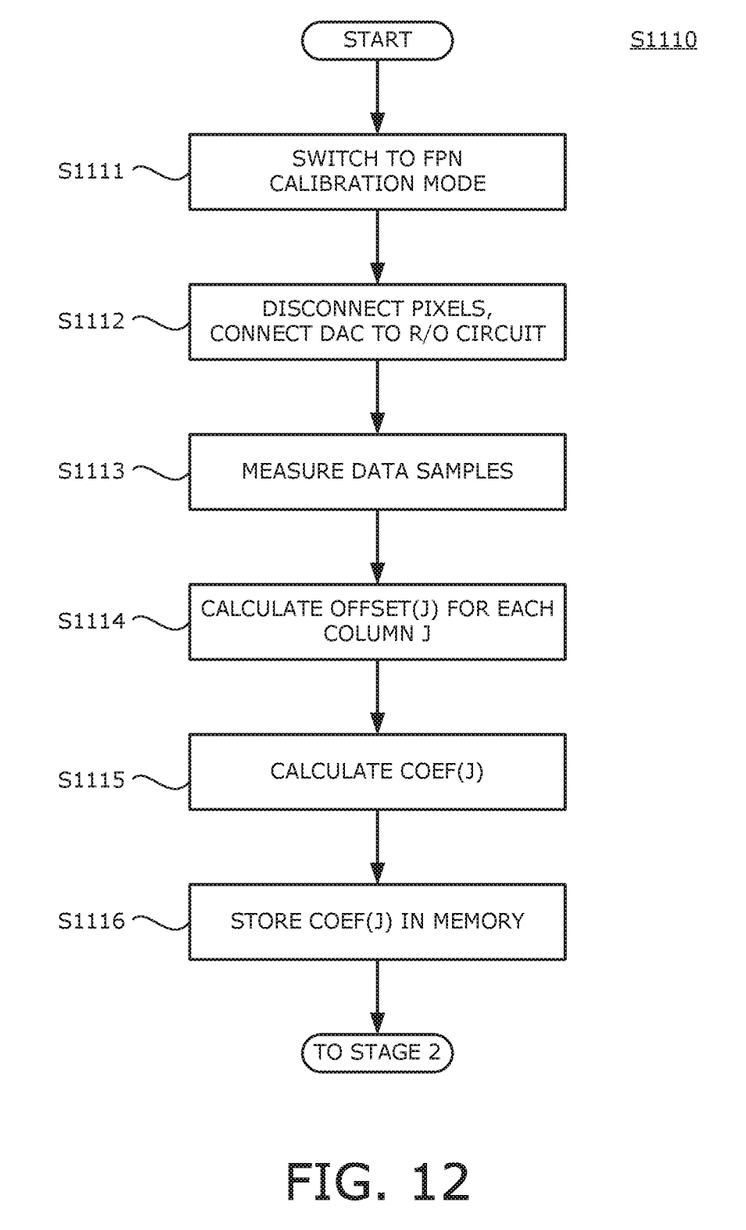
FIG. 12 illustrates an exemplary sub-process flow for the hybrid calibration method according to FIG. 11.
Figure 13:
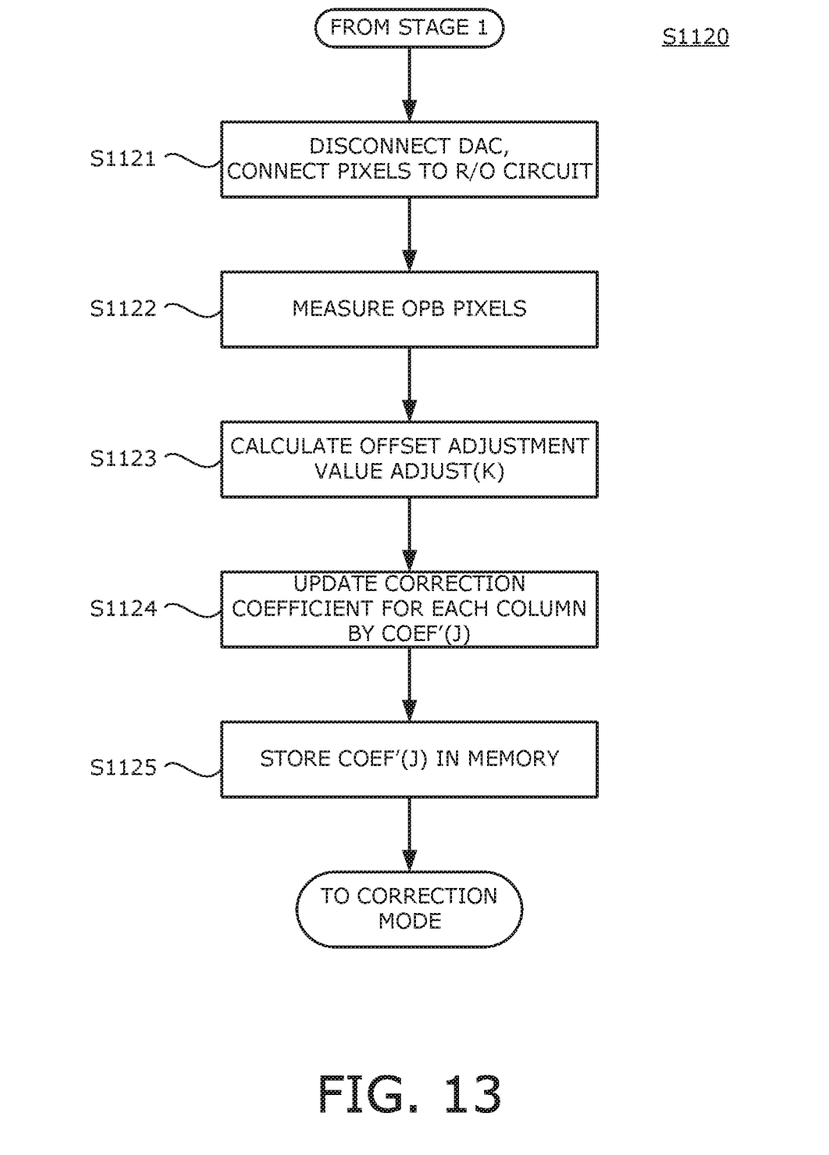
FIG. 13 illustrates another exemplary sub-process flow for the hybrid calibration method according to FIG. 11.

FIG. 9 illustrates a hybrid calibration system 900 for implementing such a hybrid calibration method. The hybrid calibration system 900 comprises the pixel circuit 110, the readout and ADC circuit 131, a DAC 901 (which may be the same as or similar to the DAC 701), a statistics and coefficient calculation module 902, a coefficient adjustment module 903, a memory module 904, and a FPN correction module 905. It is understood, although not explicitly illustrated in FIG. 9, that sample and hold circuits may be present to hold the data prior to analog-to-digital conversion. The various modules may be implemented as hardware, such as by dedicated circuit components, by software that works with the readout circuit 131, or by a combination of hardware and software. Similar to system 500 illustrated in FIG. 5, the hybrid calibration system 900 may further include a pixel reordering module which connects the output of the readout and ADC circuit 131 to an input of the statistics and coefficient calculation module 902 via a switch, to the coefficient adjustment module 903 via a switch (which may be the same switch as the one for connecting to the statistics and coefficient calculation module 902 or a different switch), and directly to the FPN correction module 905, and an inverse reordering module connected to an output of the FPN correction module 905. FIG. 10 illustrates an exemplary timing diagram, for example within the hybrid calibration system 900. FIGS. 11-13 illustrate an exemplary hybrid calibration method 1100, for example implemented by the hybrid calibration system 900.

Upon initialization of the hybrid calibration method 1100, the FPN calibration mode is entered for a given frame. At this time, the signal CALIB of FIG. 10 is switched to a high state and hybrid calibration begins. As illustrated in FIGS. 11-12, a first calibration stage S1110 begins upon entering the FPN calibration mode at step S1111. Next, at step S1112, the signal SW_CTRL is switched to a high state, causing the pixel 110 to be disconnected from the readout circuit and ADC 131 and the DAC 901 to be connected to the readout circuit and ADC 131. Because, as illustrated in FIG. 9, the two switches are controlled synchronously by the signal SW_CTRL, the readout and ADC circuit 131 is also connected to the statistics and coefficient calculation module 902 at this time.

Next, at step S1113, the output data is measured for each column j and for samples i=0, 1, . . . , L−1. At step S1114, the FPN statistics for each column are calculated in the statistics and coefficient calculation module 902; for example, according to expression (9). Next, in step S1115, the correction coefficients coef(j) are calculated in the statistics and coefficient calculation module 902; for example, according to expression (4). At step S1116, the coefficients coef(j) are stored in memory; for example, in the memory module 904. Thus, the first calibration stage S1110 ends. As illustrated in FIG. 10, the first calibration stage S1110 may be performed within the timing of a single frame.

The first calibration stage S1110 is followed by a second calibration stage S1120. In step S1121 of the second calibration stage S1120, the signal SW_CTRL is returned to a low state, causing the DAC 901 to be disconnected from the readout circuit 131 and the pixel 110 to be connected to the readout and ADC circuit 131. Because the two switches, again, are controlled synchronously by the signal SW_CTRL, the readout and ADC circuit 131 is also connected to the coefficient adjustment module 903 at this time.

Next, at step S1122, the OPB pixel circuits are measured for each column j and for row indices i=0, 1, . . . , R−1. At step S1123, the coefficient adjustment module 903 calculates an offset adjustment value adjust(k) for each phase according to the following expression (10):

$$\text{adjust}(k) = \frac{1}{R \times N/8} \sum_{i=0}^{R-1} \sum_{j=0}^{N/8-1} (OPB(i, 8j+k) - coef(j)) \quad (10)$$

Above, R is the number of rows of OPB pixel circuits used for the calibration adjustment, N is the width of the image, and coef(j) represents the coefficients stored in the memory module 904 in step S1116. Because there are 8 phases, k ranges from 0 to 7. At step S1124, the correction coefficient for each column j is updated in the coefficient adjustment module 903 according to the following expression (11):

coef(j)=coef(j)+adjust(j mod 8)=offset(j)−b+adjust(j mod 8)     (11)

Above, j mod 8 is the remainder when j is divided by 8 using integer division. Next, at step S1125, the adjusted coefficients coef′(j) are stored in memory; for example, in the memory module 904. Because the coefficients coef(j) are no longer necessary, the storage locations previously used for coef(j) may be overwritten with the values of coef′(j). Thus, the second calibration stage S1120 ends. As illustrated in FIG. 10, the second calibration stage S1120 may be performed within the timing of a single frame. Thus the first and second calibration stages combined can be performed within the timing of two frames. At step S1130, the signal CALIB is returned to a low state and the FPN correction mode is entered. Next, at step S1140, the fixed pattern noise in the pixel circuits is corrected according to the following expression (12):

y(l,j)=x(l,j)−coef′(j)     (12)

As in expression (5), x(l,j) represents an input pixel value and y(l,j) represents a corrected pixel value. Step S1140 is repeated for the succeeding frames of pixel circuits until the next calibration.

At step S1150, a determination is made whether a new calibration is required. A new calibration may be required when an operation condition of the image sensor (for example, analog gain level, temperature, voltage, etc.) is changed. Additionally or alternatively, a new calibration may be required after a predetermined number of frames have passed since the previous calibration. If, in step S1150, it is determined that no new calibration is required, the signal CALIB remains in the low state and processing continues in step S1140 with FPN correction. If, in step S1150, it is determined that a new calibration is required, the signal CALIB is switched to the high state and the hybrid calibration method 1100 returns to step S1110 to begin the new calibration.

Expression (10) calculates pixels within the OPB pixel area 104, which includes R rows that extend from columns 0 to N−1. Using expression (10), the residual offset of each phase after the correction coefficients coef(j) from the DAC data have been accounted for; thus, phase difference between the DAC data and the OPB data can be reduced. Because each of the first and second calibration stages S1110 and S1120 can be completed within a single frame, and the FPN correction mode may similarly be completed within the same frame as the second calibration stage S1120, the entire hybrid calibration method 1100 may be completed in two frames. In this manner, the hybrid calibration method 1100 can support a large number of calibration samples using the calibration DAC 901, and requires only a small number of rows of OPB pixel circuits.

Figure 14:
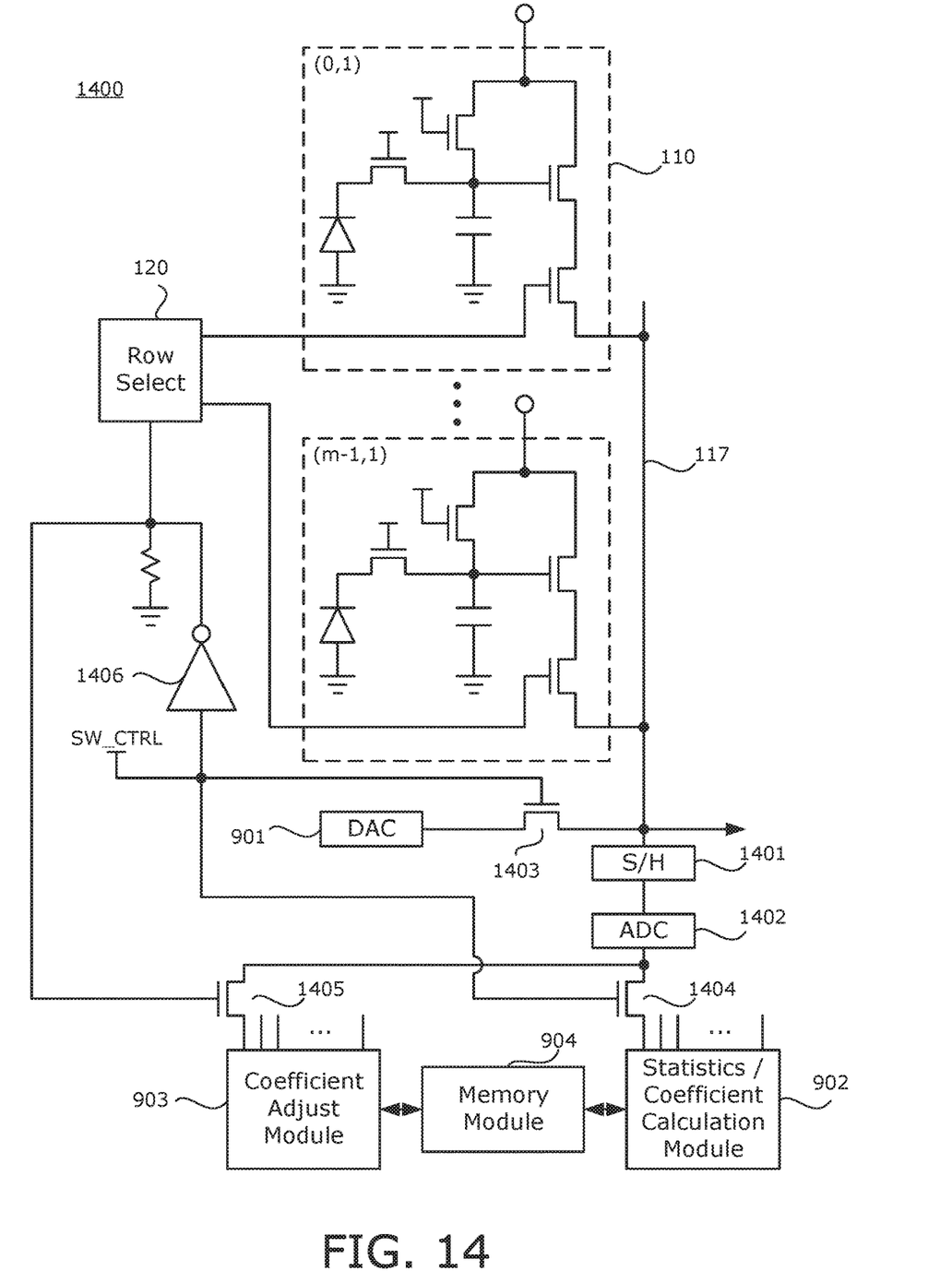
FIG. 14 illustrates an exemplary hybrid calibration circuit according to various aspects of the present disclosure.

FIG. 14 illustrates an exemplary hybrid calibration circuit 1400 for implementing the above hybrid calibration system and method. The hybrid calibration circuit 1400 comprises a plurality of pixel circuits 110, a row select circuit 120, and a readout circuit including the DAC 901, the statistics and coefficient calculation module 902, the coefficient adjustment module 903, the memory module 904, a S/H circuit 1401, an ADC 1402, transistors 1402-1405, and an inverter 1406. As noted above, the hybrid calibration circuit 1400 may further include a pixel reordering module connected to an input of the statistics and coefficient calculation module 902, an input of the coefficient adjustment module 903 and the FPN correction module 905, and an inverse reordering module connected to an output of the FPN correction module 905. For clarity, the FPN correction module is not shown in FIG. 14. Also, FIG. 14 illustrates only two particular pixel circuits at row 0 and m−1 of column 1, for purposes of clarity.

The transistor 1403 is connected between the input of the S/H circuit 1401 and the DAC 901. The transistor 1404 is connected between the output of the ADC 1402 and the statistics and coefficient calculation module 902. Thus, the transistor 1403 and the transistor 1404 operate to connect the DAC 901 and the statistics and coefficient calculation module 902 via the readout circuit during the first calibration stage.

The selection transistor within a particular pixel circuit 110 is connected between the input of the S/H circuit 1401 and the source follower transistor of the corresponding pixel circuit 110. The transistor 1405 is connected between the output of the ADC 1402 and the coefficient adjustment module 903. Thus, the selection transistor and the transistor 1405 operate to connect the pixel circuit 110 and the coefficient adjustment module 903 to the readout circuit during the second calibration stage.

When the hybrid calibration system 900 enters a calibration mode, the signal SW_CTRL is at a high level and transistors 1403 and 1404 are turned on. As a result, the output of the DAC 901 and the input of the statistics and coefficient calculation module 902 are connected to the S/H circuit 1401 and the ADC 1402 of the readout circuit. Digital data corresponding to the calibration signal from the DAC 901 and the characteristics of the readout circuit become available at the output of the ADC 1402, which provides data with a predetermined bit width of w. The data is routed via the transistor 1404 to the statistics and coefficient calculation module 902. Because the bit width of the data is w, the transistor 1404 may be repeated w times to provide a data path for each bit. Alternatively, the transistor 1404 may be implemented using a multi-bit data switch. In either event, the calculated coefficients coef(j) are then sent to the memory module 904 for storage.

For the second stage of the hybrid calibration procedure, the signal SW_CTRL is at a low level. As a result, the output of the inverter 1406 becomes high and the row select circuit 120 is enabled. Simultaneously, the transistor 1405 is turned on and transistors 1403-1404 are turned off. Similar to the transistor 1404, the transistor 1405 may be repeated w times or may be implemented using a multi-bit data switch. During this stage, the row selection circuit 120 provides the appropriate signal to various rows of the pixel array so as to route the pixel data via the signal line 117 to the S/H circuit 1401 and the ADC 1402. The digital output from the ADC 1403 is routed to the coefficient adjustment module 903 via the transistor 1405. The coefficient adjustment module adjusts the coefficients and updates the memory module 904. At this stage, the updated coefficients are ready for use in FPN correction.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A signal processing circuit for an image sensor, comprising:
   a readout circuit;
   calculation circuitry configured to calculate a correction coefficient for an effective pixel signal from a pixel circuit, based on a calibration signal, the correction coefficient indicating an amount of noise in the effective pixel signal;
   adjustment circuitry configured to update the correction coefficient based on an optical black pixel signal; and
   correction circuitry configured to apply the updated correction coefficient to the effective pixel signal and generate an output signal.

2. The signal processing circuit according to claim 1, wherein the calibration signal is connected to a digital to analog converter.

3. The signal processing circuit according to claim 2, wherein the readout circuit includes a sample and hold circuit and an analog to digital converter.

4. The signal processing circuit according to claim 3, further comprising a first switch and a second switch, wherein
   the first switch is configured to connect the digital to analog converter to an input of the readout circuit and to connect the calculation circuitry to an output of the readout circuit during a first time period in which the calculation circuitry calculates the correction coefficient, and
   the second switch is configured to connect the pixel circuit to the input of the readout circuit and to connect the adjustment circuitry to the output of the readout circuit during a second time period in which the adjustment circuitry updates the correction coefficient.

5. The signal processing circuit according to claim 1, further comprising a memory configured to store the correction coefficient.

6. The signal processing circuit according to claim 1, further comprising pixel reordering circuitry and inverse reordering circuitry.

7. A method of calibrating a signal processing circuit including a readout circuit, comprising:
   calculating a correction coefficient for an effective pixel signal from a pixel circuit, based on a calibration signal, the correction coefficient indicating an amount of noise in the effective pixel signal;

updating the correction coefficient based on an optical black pixel signal; and applying the updated correction coefficient to the effective pixel signal so as to generate an output signal.

8. The method according to claim 7, further comprising connecting the calibration signal to a digital to analog converter.

9. The method according to claim 8, wherein the readout circuit includes a sample and hold circuit and an analog to digital converter.

10. The method according to claim 9, further comprising:
connecting the digital to analog converter to an input of the readout circuit and connecting the calculation module to an output of the readout circuit during a first time period in which the calculation module calculates the correction coefficient, and connecting the pixel circuit to the input of the readout circuit and connecting the adjustment module to the output of the readout circuit during a second time period in which the adjustment module updates the correction coefficient.

11. The method according to claim 7, further comprising storing the correction coefficient in a memory.

12. The method according to claim 7 further comprising:
reordering an output of the pixel signal before updating the correction coefficient; and inversely reordering an output of the correction module so as to generate the output signal.

13. An image sensor, comprising:
a pixel array including an effective pixel area and an optical black pixel area;
a readout circuit;
calculation circuitry configured to calculate a correction coefficient for an effective pixel signal from a pixel circuit, based on a calibration signal, the correction coefficient indicating an amount of noise in the effective pixel signal;
adjustment circuitry configured to update the correction coefficient based on an optical black pixel signal; and correction circuitry configured to apply the updated correction coefficient to the effective pixel signal and generate an output signal.

14. The image sensor according to claim 13, wherein the calibration signal is connected to a digital to analog converter.

15. The image sensor according to claim 14, wherein the readout circuit includes a sample and hold circuit and an analog to digital converter.

16. The image sensor according to claim 15, further comprising a first switch and a second switch, wherein
the first switch is configured to connect the digital to analog converter to an input of the readout circuit and to connect the calculation circuitry to an output of the readout circuit during a first time period in which the calculation circuitry calculates the correction coefficient, and the second switch is configured to connect the pixel circuit to the input of the readout circuit and to connect the adjustment circuitry to the output of the readout circuit during a second time period in which the adjustment circuitry updates the correction coefficient.

17. The image sensor according to claim 13, further comprising a memory configured to store the correction coefficient.

18. The image sensor according to claim 13, further comprising pixel reordering circuitry and inverse reordering circuitry.

19. The image sensor according to claim 13, wherein the pixel array includes a plurality of pixel circuits respectively including:
a photoelectric conversion device configured to convert incident light into a signal;
a capacitor; and
a plurality of pixel transistors.

20. The image sensor according to claim 19, wherein the plurality of pixel transistors includes a transfer transistor, a reset transistor, a source follower transistor, and a selection transistor.

* * * * *